United States Patent Office 3,422,626
Patented Jan. 21, 1969

3,422,626
SOIL DRAINAGE METHOD
Edward T. Hanrahan, Coill Mhuire Sandyford Road,
Dundrum, Ireland
Filed Nov. 4, 1966, Ser. No. 592,043
U.S. Cl. 61—10          3 Claims
Int. Cl. E02b 11/00

ABSTRACT OF THE DISCLOSURE

A soil drainage method which involves placing a network of closely spaced, vertical foraminous pipes into the soil, and applying a surface load to the soil so that moisture is squeezed therefrom and drained through the pipes.

---

This invention relates to soil drainage and more particularly to a method for the acceleration of soil drainage to accomplish consolidation and strengthening of soft soils such as peat bogs, marsh land and the like, in which vertically disposed perforated or slotted pipes are utilised for the purpose.

tI is already well known from the mathematical theory of Terzaghi, that, in the drainage of soft soil, the time period for the consolidation and strengthening of the soft soil can be substantially reduced if the length of the drainage path is shortened by the installation of drainage devices. According to the above mentioned theory, shortening of the drainage path of soft soil from a length X to a length Y by the utilisation of drainage devices will result in a reduction in the period of time necessary for consolidation and strengthening of the soft soil by a reduction factor equal to $(Y/X)^2$. Many drainage devices such as sand piles, porous concrete pipes and cardboard wicks have been used to date. These devices have in general proved ineffective and/or uneconomical.

The present invention provides a method for the acceleration of drainage in soft soils such as peat bogs and marsh land for the consolidation and strengthening thereof, comprising the reducing of the length of drainage path in the soil by positioning therein a network of juxtaposed vertical pipes having openings formed in the walls thereof admitting moisture from the soil into the pipes, and applying a surface load to the soil area to be drained adapted to squeeze therefrom moisture in pressurised condition into the pipes to flow upwardly therein and drain away from the upper ends of the pipes.

Use of perforated plastics pipes, due to their low cost of manufacture, would be an advantage in the above method, since a large number of perforated plastics pipes can be economically employed, thereby ensuring a sizeable reduction in the length of the drainage path of the area to be drained resulting in a highly effective yet economical method of draining, consolidation and strengthening of the soft soil of the area drained.

Figure 1:
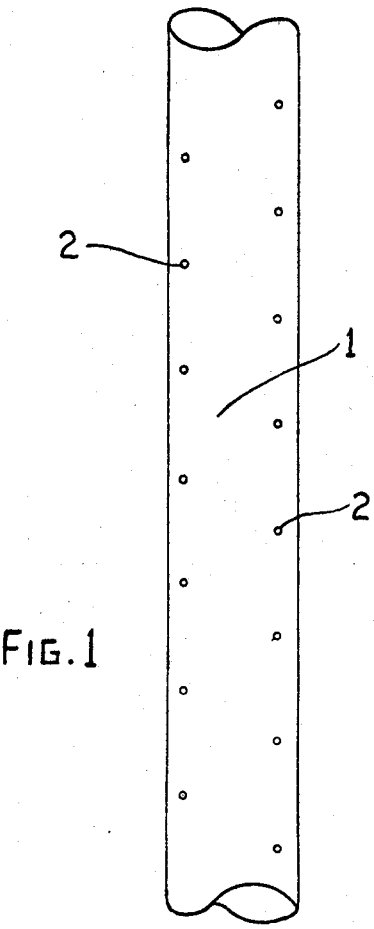
Figure 2:
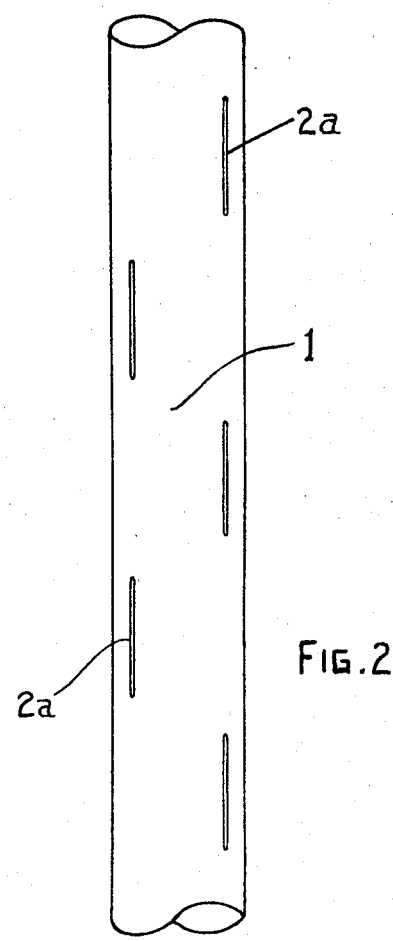
Figure 3:
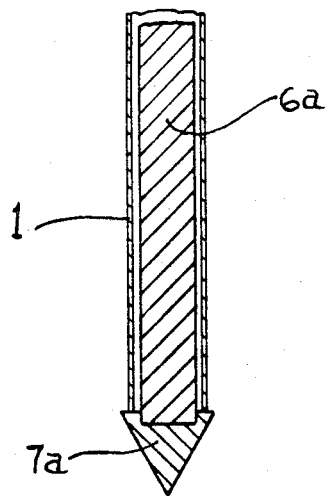
Figure 4:
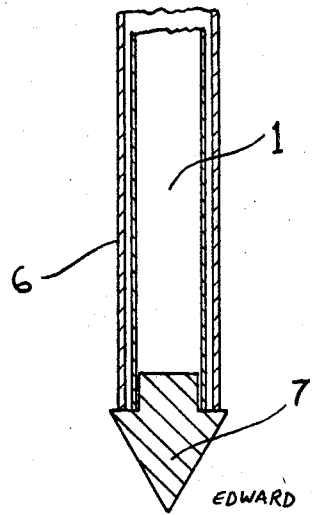
Figure 5:
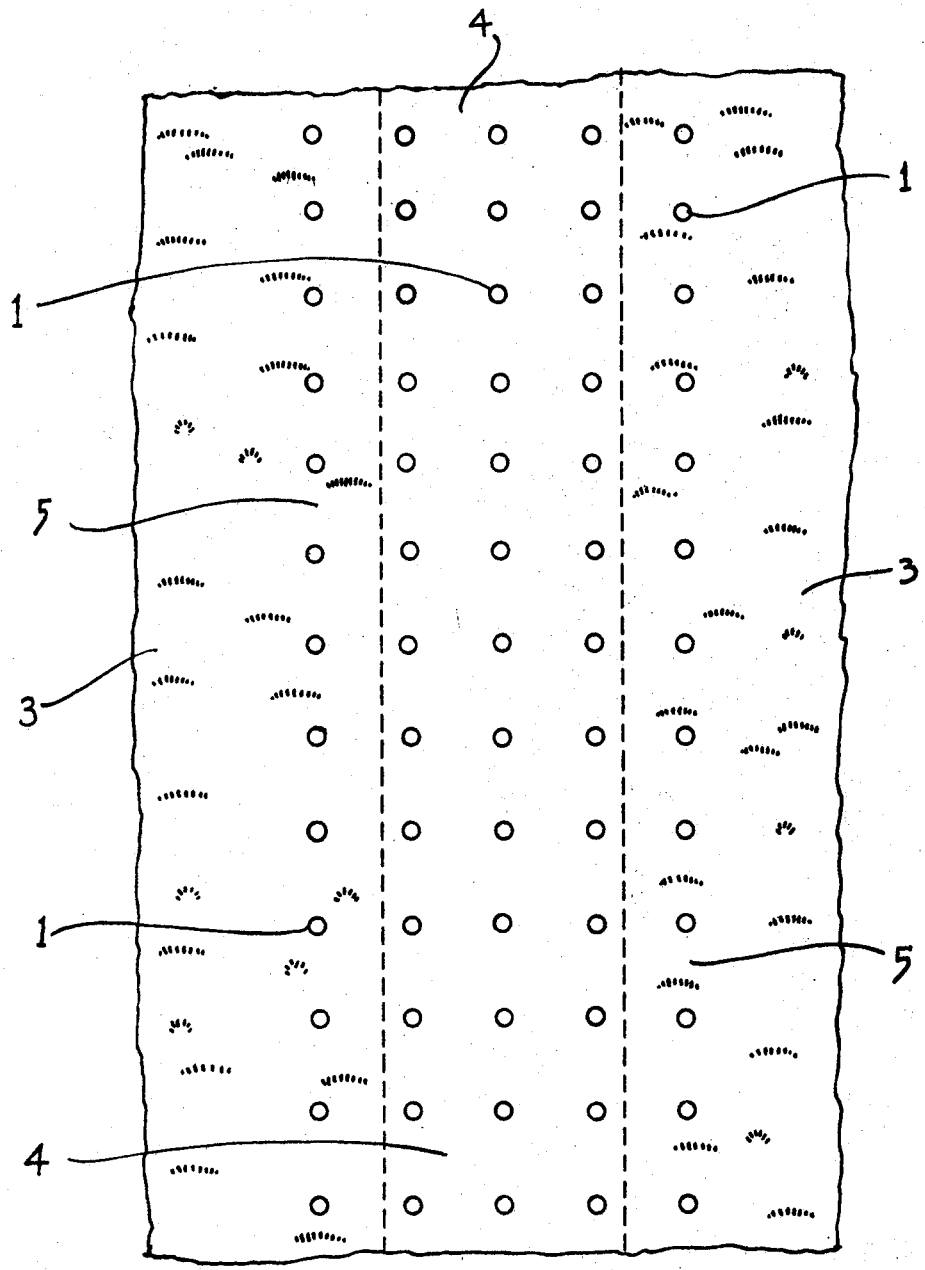

The invention will be more clearly understood from the following description of an embodiment thereof, given by way of example only, as applied to the consolidation of a predetermined area of peat bog for the construction of a road thereon, and with reference to the accompanying drawings in which FIG. 1 is a diagrammatic view of a thin wall plastics pipe having circular openings formed in the walls thereof FIG. 2 is a diagrammatic view of a thin wall plastics pipe having longitudinal slots formed in the walls thereof FIG. 3 is a vertical sectional view showing a thin walled plastics pipe mounted on a mandrel tube for driving into the soil to be drained FIG. 4 is a vertical sectional view showing a thin walled plastics pipe housed in a mandrel for driving into the soil to be drained FIG. 5 is a diagrammatic plan view of an area to be drained showing the juxtaposed thin walled plastics pipes arranged in a network.

Referring to the drawings a plurality of thin walled foraminous plastics pipes 1 of small bore, say ½", are driven vertically at close spacings therebetween of about 4 ft. centres into the predetermined area of peat bog 3 to the full or partial depth of its compressible stratum, the pipes occupying the area on which the road surface 4 defined by the dotted lines in FIG. 5, will be laid and preferably also a marginal strip 5 on each side thereof of approximately half the width of the proposed road surface 4.

The pipes 1 may be foraminous by forming the same either with a plurality of circular openings 2 as in FIG. 1, or with a plurality of slots 2a as in FIG. 2.

Each pipe 1 may be conveniently installed by firstly driving into the area a mandrel tube 6 fitted with a detachable expandable plastics end-cone 7 to the depth to which the plastics pipes 1 are to be sunk in the soil, the diameter of the hollow mandrel tube 6 being a clearance fit for the plastics pipe 1. A slotted plastics pipe 1 is inserted into the mandrel tube 6, as illustrated in FIG. 4, the end-cone 7 released from the mandrel tube 6 by imparting a downward pressure on the plastics pipe 1 while withdrawing slightly the mandrel tube 6, and the mandrel tube 6 is then fully withdrawn leaving the slotted plastics pipe 1 in position sitting on the end-cone 7 which is left incorporated in the soil. Once the mandrel tube 6 is withdrawn the soft soil will close in around the slotted plastics pipe 1. Alternatively the plastics pipe 1 may be mounted on a solid mandrel 6a fitted with an end-cone 7a, as illustrated in FIG. 3 without substantially departing from the method of installing the slotted plastics pipe 1 into the area as described above.

The foundation for the road 4, namely gravel or like material, is now placed over the area to be drained to form a superincumbent loading layer which compresses the soft soil and forces the excess water therein into the slotted plastics pipes. The excess water is, by virtue of the compression of the soil, pressurised and will therefore flow upwards in the pipe 1, to discharge at the surface and flow away to the sides of the compressed area where it may be further removed by pumping. When the soft soil has been consolidated and strengthened in this way, the construction of the road 4 may continue in known manner.

Preferably the superincumbent loading layer is applied slowly, particularly at tthe outset, to allow for the formation of initial strength and prevent, as far as possible, lateral displacement of the soft soil to be consolidated.

Once the soft soil is consolidated and strengthened, flow back of water does not occur to any detrimental extent, and deformation of the consolidated and strengthened soil is negligible.

I claim:
1. A method for the acceleration of drainage in soft soils such as peat bogs and marsh land for the consolidation and strengthening thereof, comprising the reducing of the length of drainage path in the soil by positioning therein a network of closely juxtaposed vertical small bore plastic pipes having openings formed in the walls thereof admitting moisture from the soil into the pipes, and applying a surface load to the soil area to be drained adapted to squeeze therefrom moisture in pressurised condition into the pipes to flow upwardly therein and drain away from the upper ends of the pipes.

2. A method as claimed in claim 1, in which the rate of application of the surface load to the soil area is sufficiently slow to obviate lateral displacement of the soft soil to be consolidated.

3. A method as claimed in claim 2, in which the surface load comprises gravel foundation material for a road to be constructed on the soil area.

References Cited

UNITED STATES PATENTS

| 951,668 | 3/1910 | Welsh | 61—53.7 |
| 695,583 | 3/1902 | Schietkiewics | 61—36 |
| 3,103,789 | 9/1963 | McDuff et al. | 61—11 |
| 3,330,120 | 7/1967 | Atkinson | 61—10 |

OTHER REFERENCES

Civil Engineering; vol. 23, No. 11, pp. 744 and 745; November 1953, pp. 42 and 43, copy in group unit 355, class 61, subclass 11.

EARL J. WITMER, *Primary Examiner.*